United States Patent
Wang et al.

(10) Patent No.: US 9,359,889 B2
(45) Date of Patent: Jun. 7, 2016

(54) SYSTEM AND METHODS FOR SELECTIVE SHORTING OF AN ELECTRICAL INSULATOR SECTION

(71) Applicant: Well Resolutions Technology, Houston, TX (US)

(72) Inventors: Tsili Wang, Houston, TX (US); Bruce Carter, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 337 days.

(21) Appl. No.: 14/056,626

(22) Filed: Oct. 17, 2013

(65) Prior Publication Data

US 2015/0107900 A1    Apr. 23, 2015

(51) Int. Cl.
*E21B 47/125*    (2012.01)
*E21B 47/12*    (2012.01)
*E21B 17/00*    (2006.01)

(52) U.S. Cl.
CPC ............ *E21B 47/122* (2013.01); *E21B 17/003* (2013.01)

(58) Field of Classification Search
CPC .................. E21B 47/122; E21B 17/003
See application file for complete search history.

(56) References Cited

U.S. PATENT DOCUMENTS

| | | | |
|---|---|---|---|
| 5,138,313 | A | 8/1992 | Barrington |
| 5,163,714 | A | 11/1992 | Issenmann |
| 5,749,605 | A | 5/1998 | Hampton, III et al. |
| 6,050,353 | A | 4/2000 | Logan et al. |
| 6,158,532 | A | 12/2000 | Logan et al. |
| 6,572,152 | B2 | 6/2003 | Dopf et al. |
| 7,268,696 | B2 | 9/2007 | Rodney et al. |
| 7,326,015 | B2 | 2/2008 | Reynolds, Jr. |
| 7,387,167 | B2 | 6/2008 | Fraser et al. |
| 8,308,199 | B2 | 11/2012 | Camwell et al. |
| 2007/0159351 | A1* | 7/2007 | Madhavan ............ E21B 17/003 340/855.1 |

* cited by examiner

*Primary Examiner* — Brad Harcourt
(74) *Attorney, Agent, or Firm* — Andrews Kurth LLP

(57) ABSTRACT

A bottom hole assembly attached to a drillstring includes a main body including multiple electrical insulator sections along a length thereof, each of the electrical insulator sections configured to have a voltage difference generated there across, wherein a transmitting electrical insulator section having a voltage difference generated there across is configured to remain open, and wherein all remaining electrical insulator sections are configured to be electrically shorted there across.

16 Claims, 3 Drawing Sheets

US 9,359,889 B2

SYSTEM AND METHODS FOR SELECTIVE SHORTING OF AN ELECTRICAL INSULATOR SECTION

BACKGROUND

Measurement while drilling ("MWD") tools are generally used during drilling for taking directional surveys in real time. For a directional driller to steer the well towards a target zone, the driller must know where the well is going, and the effects of his or her steering efforts. MWD tools often incorporate electrical insulators in the drillstring to transmit data. The tool generates an altered voltage difference between the top part (i.e., the main drillstring, above the electrical insulator), and the bottom part (i.e., the drill bit, and other tools located below the electrical insulator). At the surface, a wire is attached to the wellhead, which makes contact with the drillstring. A second wire is attached to a rod driven into the ground some distance away. The wellhead and the ground rod form two electrodes of a dipole antenna. The voltage difference received between the two electrodes is received by a computer and decoded.

Electrical insulators (e.g., electrical gaps) may be used for both downhole-to-surface communication (i.e., the signal is transmitted to the surface) and downhole-to-downhole communication (i.e., the signal is transmitted to a downhole location). In certain applications, two or more electrical insulators may be employed to accomplish both downhole-to-surface and downhole-to-downhole communication simultaneously. In this case, the existence of one electrical insulator may adversely affects the perform lance of the other electrical insulators.

For an electrical insulator to work properly, the drillstring and the underground formation must form a conducting path through drilling mud so that an electrical current can be driven across the electrical insulator. This generally is not a concern for wellbores drilled with salty or conducting muds because the muds adequately conduct electrical current. However, conducting an electrical current through oil-based or other non-conducting muds may be more difficult. For a BHA employing a single electrical insulator, the drill bit often provides a viable contact point between the drillstring and the formation through which electrical current may flow from the electrical insulator through the drillstring to the formation, and return to the drillstring on the other side of the electrical insulator.

But, for a BHA employing two or more electrical insulators, lower electrical insulators (closer to the bit) may break or impede the path of current flowing from the upper electrical insulator that relies on the drill bit as the contact point. What is needed then is an apparatus and method having multiple electrical insulators that may be operated simultaneously without adversely affecting others' operation.

SUMMARY

In one aspect, embodiments disclosed herein relate to a bottom hole assembly attached to a drillstring including a main body including a first electrical insulator section separating a first body portion from a second body portion, a second electrical insulator section separating the second body portion from a third body portion, and a circuit element connected across the second electrical insulator section. The circuit element is configured to be closed and provide an electrical current path across the second electrical insulator section upon a voltage signal at a first frequency being generated across the first electrical insulator section. The circuit element is configured to be opened and break said electrical current path across the second electrical insulator section upon a voltage signal at a second frequency being generated across the second electrical insulator section.

Other aspects relate to a bottom hole assembly attached to a drillstring including a main body including multiple electrical insulator sections along a length thereof and a circuit element connected across each of said multiple electrical insulator sections. Each of said multiple electrical insulator sections are configured to have a voltage difference generated there across. The circuit element of an electrical insulator section having a voltage difference at a first frequency generated there across is configured to not allow an electrical current to travel there across. The circuit elements of all remaining electrical insulator sections not having said voltage difference at said first frequency generated there across are configured to allow an electrical current to travel there across.

Yet other aspects relate to a method of selectively transmitting a signal generated from multiple electrical insulator sections for providing downhole measurements including providing a tool body including multiple electrical insulator sections disposed along a length thereof, generating a voltage signal at a first frequency across one of the multiple electrical insulator sections, providing an electrical current path across all remaining electrical insulator sections not having said voltage signal at said first frequency generated there across, and transmitting said signal relating to said generated voltage signal to a location apart from said tool body.

BRIEF DESCRIPTION OF THE DRAWINGS

The invention is illustrated in the accompanying drawings wherein.

DETAILED DESCRIPTION

Figure 1:
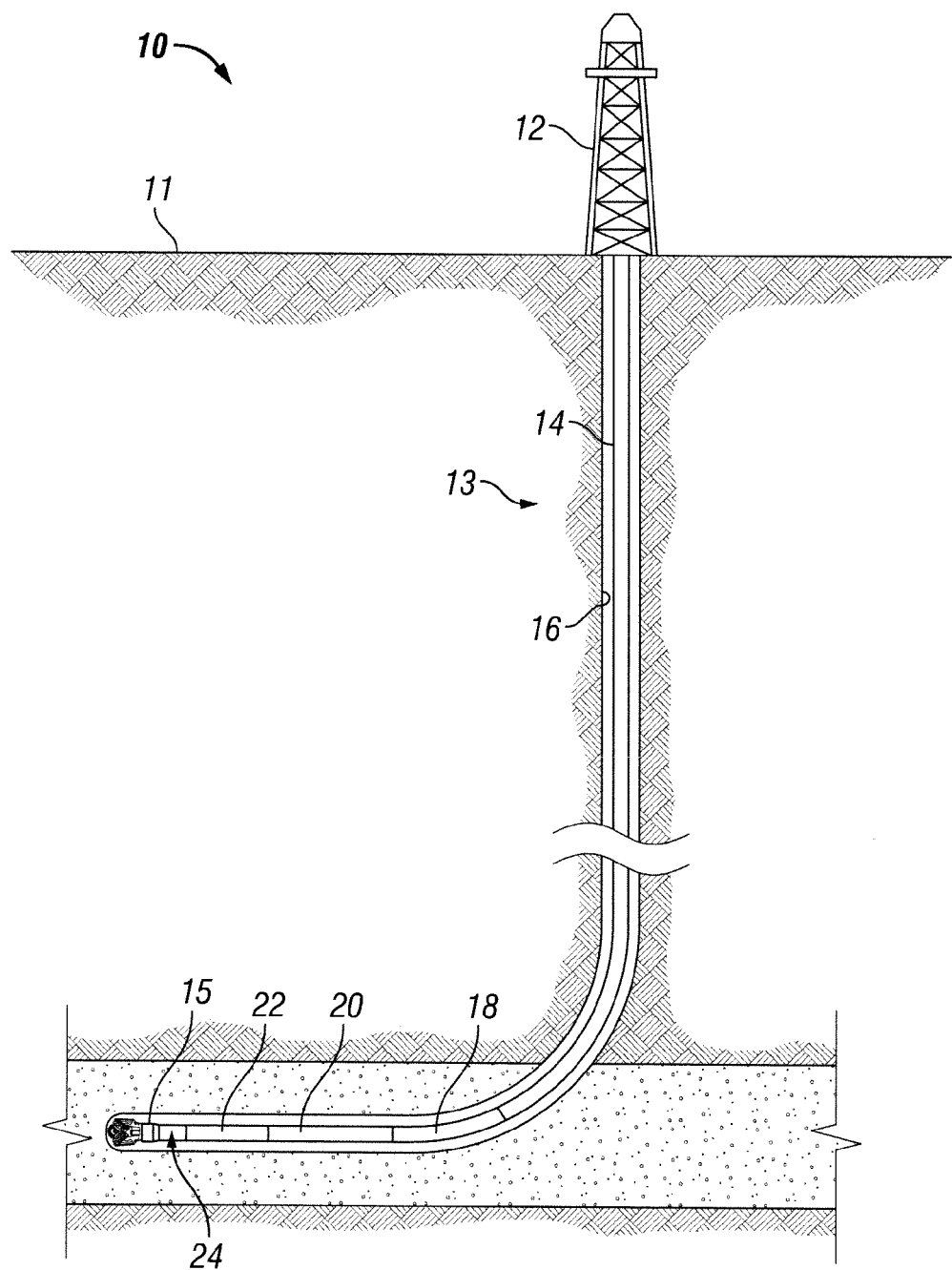
FIG. 1 illustrates a conventional drilling rig on which exemplary embodiments of the apparatus and methods disclosed herein may be utilized.

The aspects, features, and advantages of the invention mentioned above are described in more detail by reference to the drawings, wherein like reference numerals represent like elements.

A bottom hole assembly (BHA), such as a measurement-while-drilling (or "MWD") tool for performing drilling related measurements downhole is disclosed. FIG. 1 illustrates a drilling assembly 10 in which the bottom hole assembly described herein may be deployed. A drilling rig 12 including a derrick and platform is positioned at the surface 11 over an oil and gas formation 13 disposed therebeneath. A drillstring 14 have a drill bit 15 on end thereof extends from the drilling rig 12 into a borehole 16 in the formation 13. The drillstring 14 may include any number of downhole tools including, for example, measurement while drilling 18 ("MWD") tools, logging while drilling 20 ("LWD") tools, stabilizers (not shown), a rotary steerable tool (not shown), a downhole drilling motor 22, and one or more at-bit sensors 24. It should be understood that the bottom hole assembly described herein in accordance with one or more embodiments is useful in any type of drilling operation, either onshore or offshore. Moreover, the bottom hole assembly described herein may be used in operation other than drilling, for example, wireline.

The bottom hole assembly disclosed herein may provide information about the conditions at the drill bit, such as rotational speed of the drillstring, smoothness of the drillstring rotation, type and severity of any downhole vibrations, downhole temperatures, torque and weight on bit, mud flow volume, and others. The tool may be coupled with or used with any other downhole tools, including but not limited to, mud motors, rotary steerable systems, and logging-while-drilling (or "LWD") tools. The BHA may include an electromagnetic (EM) transmitter, which collects drilling and geological data related to the drilling operation, and a receiver for receiving data from the transmitter and which subsequently sends the received drilling and geological data to a remote location, either at the surface or downhole, where the data is collected and analyzed.

The BHA may include multiple electrical insulators disposed along a length thereof. The electrical insulators may be composed of an insulating material to permit the passage of EM radiation therethrough. The insulating materials may include a class of polyetherketones or other suitable resins. For example, fiberglass-epoxy, PEK and PEEK are dielectric materials or resins that permit the passage of signal energy including electromagnetic radiation. In certain embodiments, the BHA may include two electrical insulators that serve different purposes (e.g., one for downhole-to-surface communication and the other for downhole-to-downhole communication). The two electrical insulators may operate simultaneously although independently of each other. For example, a first electrical insulator may remain electrically shorted while a second electrical insulator operates. As used herein, operates means transmitting or generating a voltage signal across the electrical insulator for communicating data to a remote or separate location, as will be understood by those skilled in the art. The above described apparatus may alternatively be configured to include any number of multiple electrical insulator sections. An electrical insulator section that is transmitting or generating a signal may remain "open," i.e., a voltage difference is generated across the insulator section. Any remaining electrical insulator sections may be electrically shorted. The remaining electrical insulator sections may be non-transmitting electrical insulator sections in certain embodiments. As used herein, "across" or "there across" in reference to the electrical insulator sections may refer to an axial length of the electrical insulator sections, from substantially a first end of the section to an opposite or second end of the section. An axial length of the electrical insulator sections is in reference to a central axis of the drillstring or tool body in which the electrical insulator sections are disposed.

One or more electrical insulator sections may be electrically shorted by way of a circuit element connected across one or more or each of the multiple electrical insulator sections in accordance with one or more embodiments. In certain embodiments, more than one circuit element may be connected across one or more of the multiple electrical insulator sections. The circuit elements may include inductors, capacitors, resistors, and others, and any combination thereof. The circuit elements may be configured to selectively "short" (e.g., provide or create an electrical circuit that allows a current to travel along the circuit element where no or very little electrical impedance is encountered) one or more of the multiple electrical insulator sections. A resonance frequency may be selected and matched for each of the circuit elements, so that at a particular resonance frequency, a circuit element in an electrical insulator section produces an impedance suitable for generating a voltage signal for communicating data. However, at that same resonance frequency, other circuit elements in other electrical insulator sections are selected so that little to no impedance is produced, thereby shorting the other electrical insulator sections. Accordingly, multiple resonance frequencies may be selected, each of which may be implemented with one or more of the multiple circuit elements. The multiple resonance frequencies may be separated by a sufficient frequency range (e.g., 10 Hz) to avoid accidently shorting and opening unintended electrical insulator sections.

Figure 2:
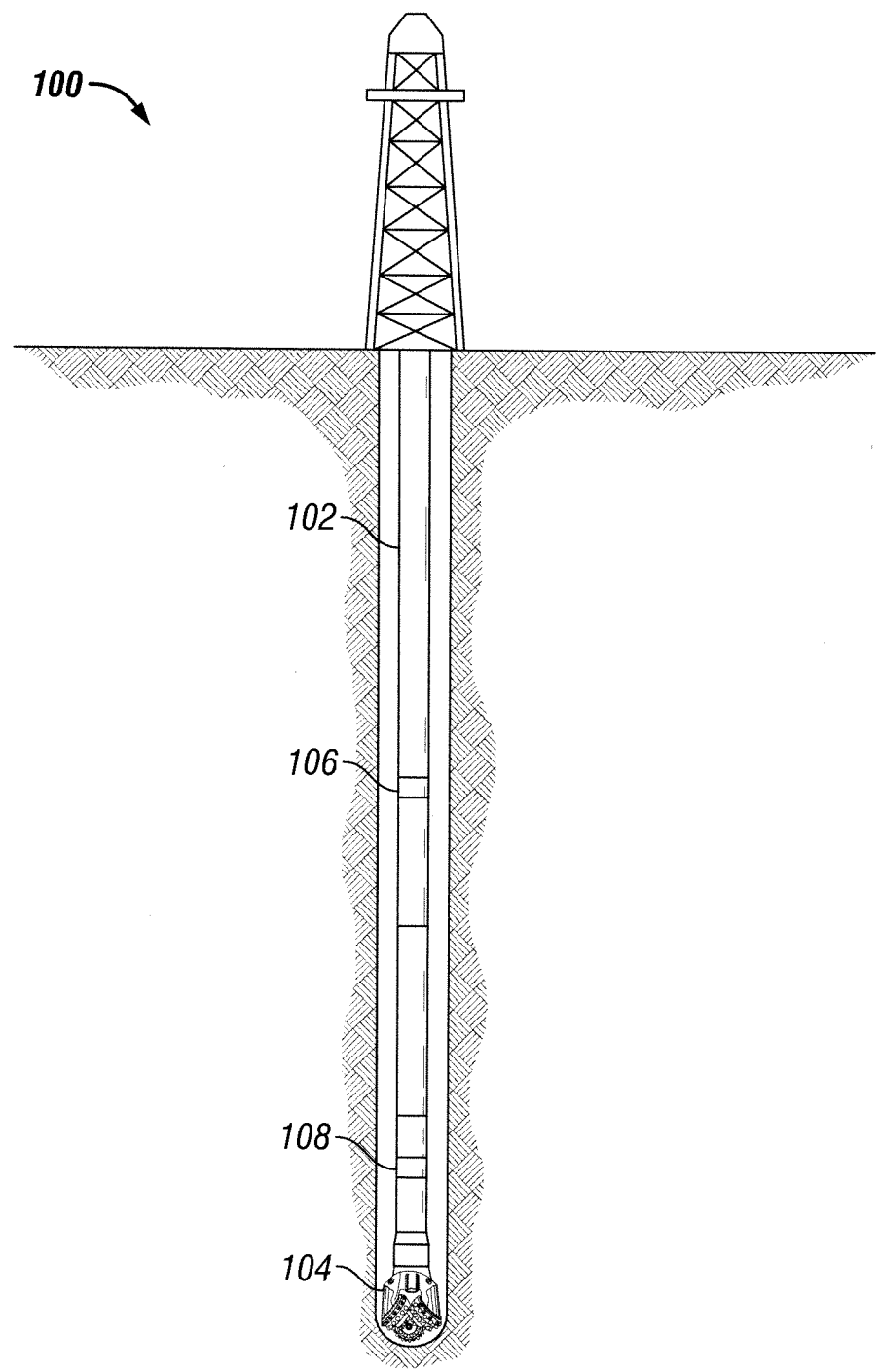
FIG. 2 illustrates a bottom hole assembly in accordance with one or more embodiments.

FIG. 2 illustrates a downhole tool or BHA 100 in accordance with one or more embodiments. The BHA includes two electrical insulator sections, an upper electrical insulator section 106 and a lower electrical insulator section 108. The upper electrical insulator section 106 may be used for downhole-to-surface communication, and the lower electrical insulator section 108 may be used for downhole-to-downhole communication. The signals generated for downhole-to-surface communication usually travel over a much longer distance than those for downhole-to-downhole communication. Because of this, a voltage signal generated across the upper electrical insulator section 106 may be a low-frequency signal. For example, a low-frequency signal may be at least 1 Hz, or at least 2 Hz, or at least 5 Hz, and up to 7 Hz, or up to 8 Hz, or up to 10 Hz. A voltage signal generated across the lower electrical insulator section 108 may be a high-frequency signal. For example, a high-frequency signal may be at least 500 Hz, or at least 1000 Hz, or at least 1500 Hz, or at least 2000 Hz, and up to 3000 Hz, or up to 4000 Hz, or up to 4500 Hz, or up to 5000 Hz.

The lower electrical insulator section 108 serves as termination of the BHA for the upper electrical insulator section 106. For oil-based mud through which electrical current does not travel easily, this implies that the drill bit 104 contact with the formation is effectively removed from the electrical current path for the upper electrical insulator section 106. To maintain the electrical current continuity through the lower electrical insulator section 108 when the upper electrical insulator section 106 transmits, the lower electrical insulator section 108 remains electrically shorted when a voltage signal is generated across the upper electrical insulator section 106. On the other hand, the lower electrical insulator section 108 is open (i.e., not electrically shorted) when a voltage signal is generated across the lower electrical insulator section 108.

Figure 3:
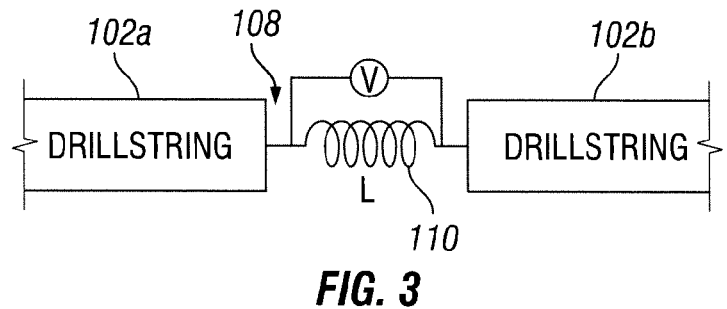
FIG. 3 illustrates an inductor connected across an electrical insulator section in accordance with one or more embodiments.

Referring to FIG. 3, a circuit element, for example an inductor 110, is connected across the lower electrical insulator section 108. A voltage signal generated across the upper electrical insulator section 106 travels downward along the drillstring until the signal or current encounters the lower electrical insulator section 108. The voltage signal travels across the lower electrical insulator section 108 through the inductor 110. The impedance of the electrical insulator section is calculated according to $j\omega L$, wherein $j$ is the square root of $(-1)$, $\omega$ is the frequency of the voltage source, and $L$ is inductance (measured in Henrys). So long as the frequency of the voltage signal is sufficiently low, the electrical insulator section impedance will be negligible. Accordingly, the electrical insulator section is electrically shorted.

Figure 4:
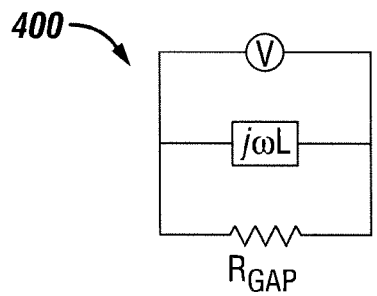
FIG. 4 illustrates an equivalent circuit of FIG. 3.

FIG. 4 illustrates an equivalent circuit 400 for the lower electrical insulator section 108 including an inductor 110 shown in FIG. 3. $R_{gap}$ is the resistance "seen" by the lower electrical insulator section 108 across the electrical insulator section 108 without the inductor 110. $R_{gap}$ depends on the resistivity of the formation around the wellbore, the resistivity of drilling mud, the size of the borehole, and the length of the electrical insulator section, among others. For simplicity, the resistance of the inductor 110 has been omitted. The total impedance of the circuit is calculated using the following equation:

$$Z = \frac{j\omega LRgap}{Rgap + j\omega L} \quad \text{Equation (1)}$$

For a sufficiently larger value of L, the total impedance across the lower electrical insulator section 108 approaches $R_{gap}$. As an example, one may assume $R_{gap}$=10 ohms and L=10 mH. Then, for a frequency of 3 kHz, Z=9.97+j0.53 ohm≈$R_{gap}$. Lowering the frequency will introduce a larger reactance component to the total impedance. For instance, at 1 kHz, Z=9.75+j 1.55 ohm. The reactance part will be about 16% of the resistance.

Figure 5:
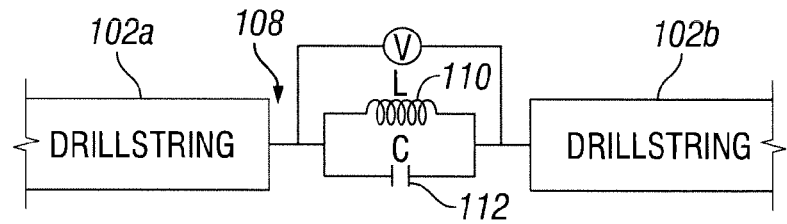
FIG. 5 illustrates a capacitor connected across an electrical insulator section in accordance with one or more embodiments.
Figure 6:
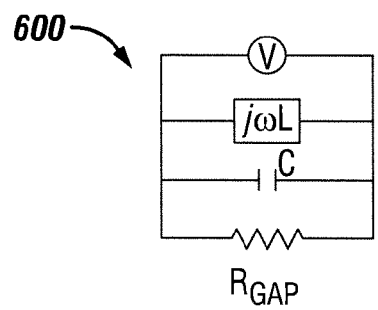
FIG. 6 illustrates an equivalent circuit of FIG. 5.

In other embodiments, the circuit element may include a capacitor shown in FIG. 5. FIG. 6 illustrates an equivalent circuit 600 for the lower electrical insulator section 108 including a capacitor 112 shown in FIG. 5. A total impedance of the circuit shown in FIG. 6 is calculated using the following equation:

$$Z = \frac{j\omega LRgap}{(1 - \omega^2 LC)Rgap + j\omega L} \quad \text{Equation (2)}$$

At very low frequencies:

$$z \approx j\omega L \quad \text{Equation (3)}$$

That is, the electrical insulator section may effectively be electrically shorted because of the low impedance. At very high frequencies:

$$Z \approx \frac{1}{j\omega C} \quad \text{Equation (4)}$$

The electrical insulator section then behaves as a capacitor. If frequency is chosen such that:

$$\omega^2 LC=1 \quad \text{Equation (5)}$$

then the impedance may be calculated as:

$$Z=Rgap \quad \text{Equation (6)}$$

Equation (5), or the resonance frequency, causes the L-C branch (e.g., the circuit branch including the inductor/capacitor) of the circuit to resonate, which electrically opens the electrical insulator section for the frequency. For instance, to drive the electrical insulator section at 1 kHz would require LC=2.53×10$^{-8}$. For L=10 mH, a capacitor with C=2.53 μF may be chosen.

One or more embodiments disclosed herein relate to a bottom hole assembly attached to a drillstring including a main body including a first electrical insulator section separating a first body portion from a second body portion, a second electrical insulator section separating the second body portion from a third body portion, and a circuit element connected across the second electrical insulator section. The circuit element is configured to be closed and provide an electrical current path across the second electrical insulator section upon a voltage signal at a first frequency being generated across the first electrical insulator section. The circuit element is configured to be opened and break said electrical current path across the second electrical insulator section upon a voltage signal at a second frequency being generated across the second electrical insulator section.

Other embodiments disclosed herein relate to a bottom hole assembly attached to a drillstring including a main body including multiple electrical insulator sections along a length thereof and a circuit element connected across each of said multiple electrical insulator sections. Each of said multiple electrical insulator sections are configured to have a voltage difference generated there across. The circuit element of an electrical insulator section having a voltage difference at a first frequency generated there across is configured to not allow an electrical current to travel there across. The circuit elements of all remaining electrical insulator sections not having said voltage difference at said first frequency generated there across are configured to allow an electrical current to travel there across.

Yet other embodiments disclose a method of selectively transmitting a signal generated from multiple electrical insulator sections for providing downhole measurements including providing a tool body including multiple electrical insulator sections disposed along a length thereof, generating a voltage signal at a first frequency across one of the multiple electrical insulator sections, providing an electrical current path across all remaining electrical insulator sections not having said voltage signal at said first frequency generated there across, and transmitting said signal relating to said generated voltage signal to a location apart from said tool body.

The claimed subject matter is not to be limited in scope by the specific embodiments described therein. Indeed, various modifications of one or more embodiments disclosed herein in addition to those described herein will become apparent to those skilled in the art from the foregoing descriptions. Such modifications are intended to fall within the scope of the appended claims.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

What is claimed:

1. A bottom hole assembly attached to a drillstring, the bottom hole assembly comprising:
   a main body comprising:

a first electrical insulator section separating a first body portion from a second body portion;

a second electrical insulator section separating the second body portion from a third body portion; and a circuit element connected across the second electrical insulator section;

wherein the circuit element is configured to be closed and provide an electrical current path across the second electrical insulator section upon a voltage signal at a first frequency being generated across the first electrical insulator section, and wherein the circuit element is configured to be opened and break said electrical current path across the second electrical insulator section upon a voltage signal at a second frequency being generated across the second electrical insulator section, and wherein the circuit element comprises a capacitor.

2. The bottom hole assembly of claim 1, wherein the voltage signal at the first frequency is less than about 10 Hz.

3. The bottom hole assembly of claim 1, wherein the voltage signal at the second frequency signal is greater than about 500 Hz.

4. A bottom hole assembly attached to a drillstring, the bottom hole assembly comprising:

a main body including multiple electrical insulator sections along a length thereof; and a circuit element connected across each of said multiple electrical insulator sections, wherein each of said multiple electrical insulator sections are capable of having a voltage difference generated there across;

wherein said circuit element of an electrical insulator section having a voltage difference at a first frequency generated there across is configured to not allow an electrical current to travel there across, and wherein said circuit elements of all remaining electrical insulator sections not having said voltage difference at said first frequency generated there across are configured to allow an electrical current to travel there across, and wherein multiple resonance frequencies are selected, each of which is implemented with each of the multiple electrical insulator sections.

5. The bottom hole assembly of claim 4, wherein the multiple resonance frequencies are separated by at least 10 Hz.

6. The bottom hole assembly of claim 4, wherein said circuit element is selected from the group consisting of an inductor, a capacitor, and a resistor.

7. The bottom hole assembly of claim 4, wherein the transmitting electrical section has a voltage difference generated there across at a frequency below 10 Hz.

8. The bottom hole assembly of claim 4, wherein said circuit element of an electrical insulator section having a voltage difference at a second frequency generated there across is configured to not allow an electrical current to travel there across, and wherein said circuit elements of all remaining electrical insulator sections not having said voltage difference at said second frequency generated there across are configured to allow an electrical current to travel there across.

9. The bottom hole assembly of claim 8, wherein said circuit element of an electrical insulator section having a voltage difference at a third frequency generated there across is configured to not allow an electrical current to travel there across, and wherein said circuit elements of all remaining electrical insulator sections not having said voltage difference at said third frequency generated there across are configured to allow an electrical current to travel there across.

10. A method of selectively transmitting a signal generated from multiple electrical insulator sections for providing downhole measurements, the method comprising:

providing a tool body including multiple electrical insulator sections disposed along a length thereof;

generating a voltage signal at a first frequency across one of the multiple electrical insulator sections;

providing an electrical current path across all remaining electrical insulator sections not having said voltage signal at said first frequency generated there across; and transmitting said signal relating to said generated voltage signal to a location apart from said tool body.

11. The method of claim 10, further comprising selecting different resonance frequencies for generating a voltage signal across each of the multiple electrical insulator sections.

12. The method of claim 11, further comprising separating said selected different resonance frequencies by at least at least 10 Hz.

13. The method of claim 10, further comprising providing a circuit element that extends across each of the multiple electrical insulator sections.

14. The method of claim 13, further comprising providing said circuit element selected from the group consisting of an inductor, a capacitor, and a resistor.

15. The method of claim 10, further comprising generating a voltage signal at a second frequency across one of the multiple electrical insulator sections, and providing an electrical path across all remaining electrical insulator sections not having said voltage signal at said second frequency generated there across.

16. The method of claim 15, further comprising generating a voltage signal at a third frequency across one of the multiple electrical insulator sections, and providing an electrical path across all remaining electrical insulator sections not having said voltage signal at said third frequency generated there across.

* * * * *